United States Patent [19]

Harper

[11] Patent Number: 5,146,438
[45] Date of Patent: Sep. 8, 1992

[54] METHOD OF MAKING DOUBLE-SIDED MAGNETO-OPTICAL DISKS HAVING REDUCED BIREFRINGENCE

[75] Inventor: Fred J. Harper, Shelby, N.C.

[73] Assignee: E. I. Du Pont de Nemours & Co., Wilmington, Del.

[21] Appl. No.: 530,350

[22] Filed: May 30, 1990

[51] Int. Cl.[5] .................. G11B 11/00; G11B 3/70; G11B 7/26
[52] U.S. Cl. .................. 369/13; 369/275.1; 369/282; 369/286
[58] Field of Search .............. 369/284, 286, 288, 13, 369/275.1, 275.2, 275.3, 275.4, 275.5; 346/76 L, 135.1; 428/64, 65

[56] References Cited

U.S. PATENT DOCUMENTS

| | | | |
|---|---|---|---|
| 4,432,002 | 2/1984 | Ando | 346/76 L |
| 4,449,138 | 5/1984 | Ando | 346/135.1 |
| 4,731,620 | 3/1988 | Yabe | 369/286 |
| 4,740,947 | 4/1988 | Ohta | 369/286 |
| 4,834,819 | 5/1989 | Todo | 369/286 |
| 4,847,827 | 7/1989 | Hayashi | 346/135.1 |
| 4,892,606 | 1/1990 | Miyazaki | 346/135.1 |
| 4,909,871 | 3/1990 | Todo | 369/286 |
| 4,911,968 | 3/1990 | Higasihara | 346/135.1 |
| 4,939,011 | 6/1990 | Takahashi | 428/64 |
| 4,954,379 | 9/1990 | Nishida | 428/64 |

Primary Examiner—Stuart S. Levy
Assistant Examiner—Tan Nguyen
Attorney, Agent, or Firm—Norman N. Spain

[57] ABSTRACT

The invention is directed to a two-sided magneto-optical recording disk having reduced birefringence comprising a pair of single-sided magneto-optical recording disks, the entire recording sides of which are adhered together by means of a continuous layer of polymeric adhesive. An external mechanical laminating pressure in a vacuum is applied to the non-information areas of the a magneto-optical disk.

7 Claims, 4 Drawing Sheets

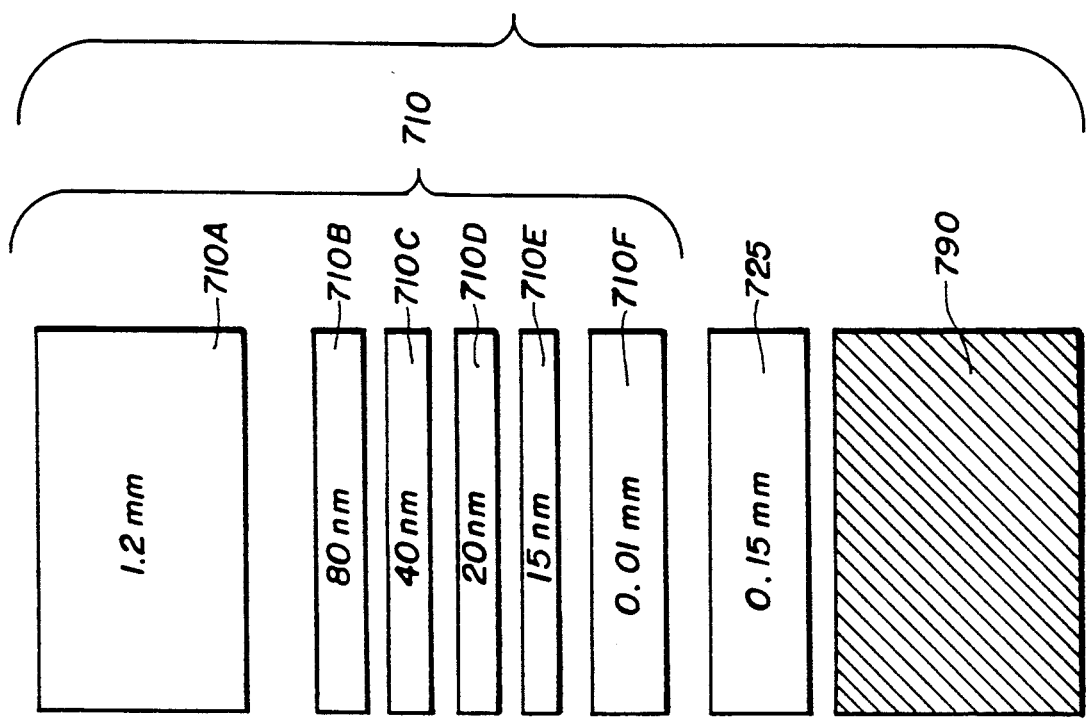
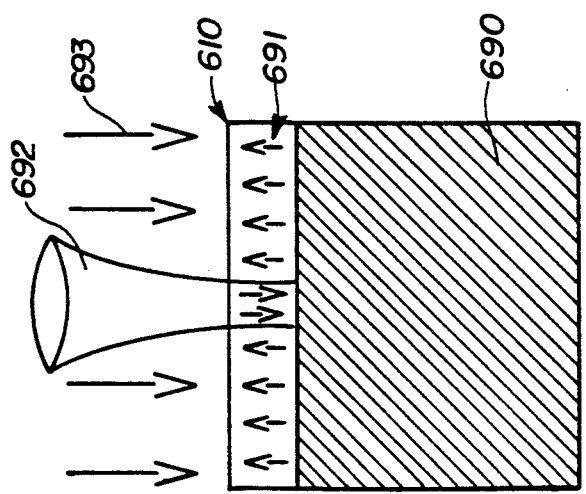

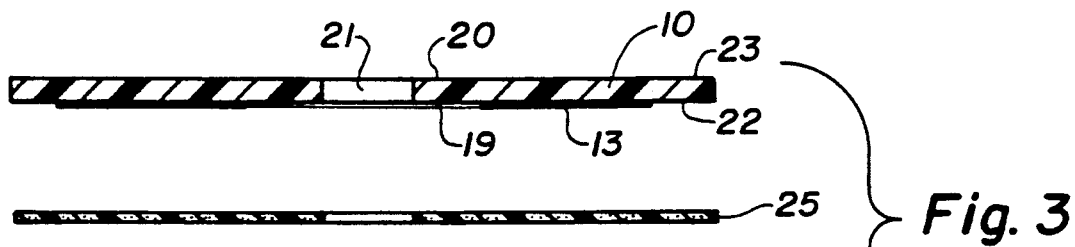
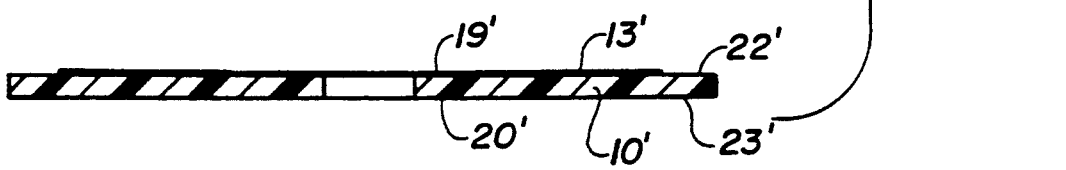
Fig. 3
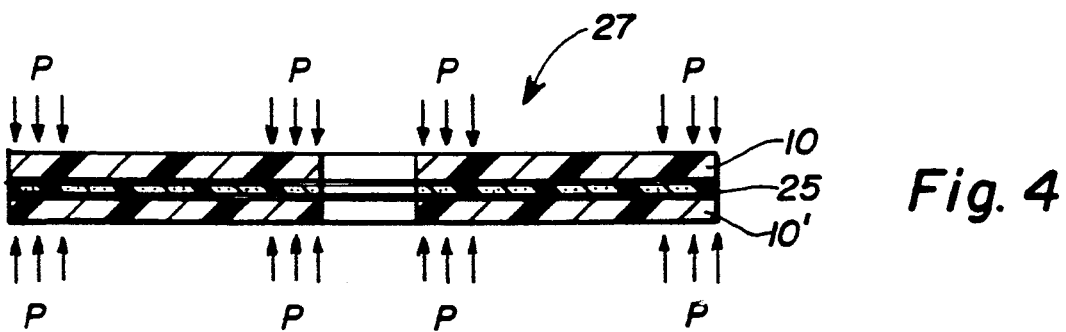
Fig. 4
Fig. 5
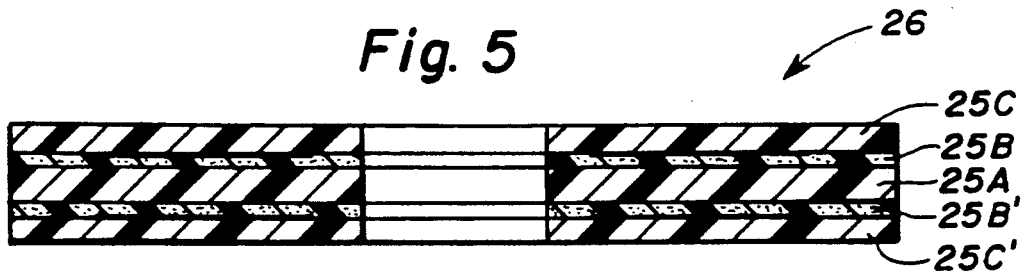

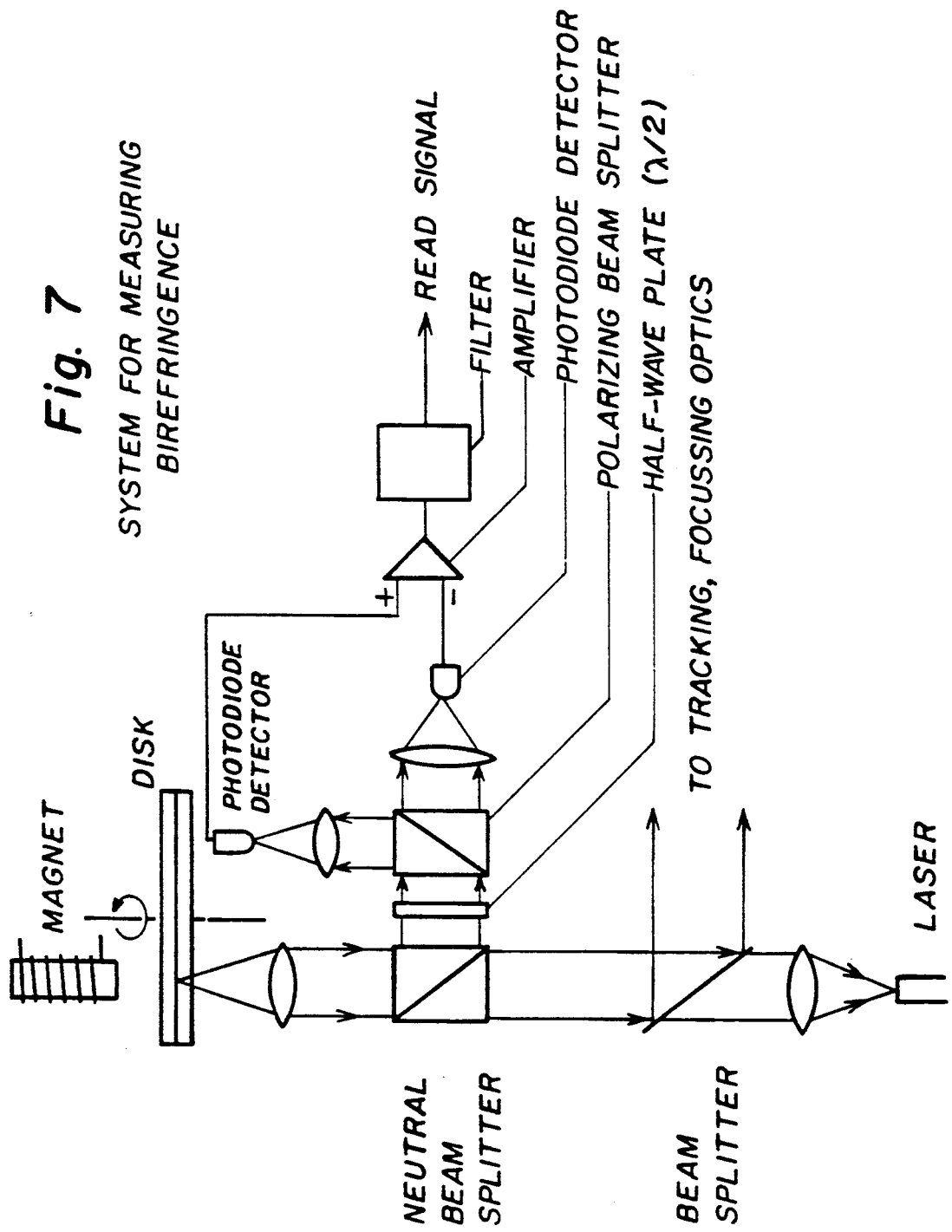

METHOD OF MAKING DOUBLE-SIDED MAGNETO-OPTICAL DISKS HAVING REDUCED BIREFRINGENCE

FIELD OF THE INVENTION

The invention relates to double-sided magneto-optical disks, and more particularly to a method of fabricating compact magneto-optical disks which have considerably reduced birefringence.

BACKGROUND OF THE INVENTION

In response to the demand for more reliable and higher capacity data storage and retrieval systems, there is considerable activity in the research and development of optical disk recording systems. These systems utilize a highly focused modulated beam of light, such as a laser beam, which is directed onto a recording layer which is capable of absorbing a substantial amount of light. The heat thusly produced causes the light-absorbing material in the areas struck by the highly focused laser beam to change chemically and/or physically, thus producing a concomitant change in optical properties, e.g., transmissivity or reflectivity, in the affected area. For readout, the contrast between the amount of light transmitted or reflected from the unaffected parts of the absorbing layer and from the marked areas of the layer is measured. Examples of such recording systems are disclosed in numerous U.S. patents such as U.S. Pat. Nos. 3,314,073 and 3,474,457.

The simplest optical disk consists merely of a dimensionally stable solid substrate on which is coated a thin layer of light-absorptive material such as a metal layer. When the light-absorptive layer is struck by an intense beam of coherent light, such as from a laser source, the light-absorptive material is either vaporized and/or thermally degraded, thereby producing a very small marked area which exhibits different transmissivity or reflectivity than the adjacent unmarked layer. A more advanced laser recording medium is disclosed in Nam, U.S. Pat. No. 4,410,581 in which a single recording layer is completely encapsulated between an intermediate layer of solvent-resistant plastic material formed on a transparent substrate and a protective solvent-based plastic layer formed on the recording layer. In this instance, the encapsulated recording layer is imaged by a laser beam passing through the transparent substrate to burn a very small hole in the layer. In this context, the term "transparent" means that the material will transmit at least 85% of any light directed into it having a wavelength of 810–830 um.

It is obvious that when the information is recorded in a permanent manner as discussed above, it may not be erased and new information be written again on the disk. This limitation is vacated by using magneto-optical techniques to record, read, erase, and re-write information. These techniques are represented by a different class of optical disks, named magneto-optical disks.

A magneto-optical disk, as shown in FIG. 1, comprises a magnetic film 610C deposited on a transparent substrate 690. Magnetic layer 610C is overall magnetized as the vectors 691 indicate. The write-in or recording procedure is performed by applying a bias external magnetic field 693, which reverses the direction of the magnetized particles when a small area is heated by a focused beam 692 and their temperature is raised beyond the Curie Temperature. This arrangement allows not only writing information but also erasing the disk and re-writing. This type of optical disk can be erased by a constant flood overall exposure of the magnetic areas with a laser beam in the presence of a bias magnetic field.

The structure in actual practice is more complicated than the simplified view of FIG. 1. FIG. 2 illustrates a typical magneto-optical disk in more detail. It comprises a defocusing layer 710A which usually is made of polycarbonate material, a dielectric enhancement layer 710B, a magnetic layer 710C, a metal deflector layer 710D, a dielectric barrier layer 710E, and a protective layer 710F. A laminated adhesive bond layer 725 is used to attach this system onto a substrate 790. The dielectric layers may be nitrides or oxides that give optical enhancement properties as well as good barrier properties. The metal or reflector layers may be aluminum, titanium or chromium, and the like which give good optical reflection properties as well as barrier properties.

As mentioned above, a laser beam may be used in cooperation with a bias magnetic field selectively to reverse the magnetic vectors and write magnetic information on the disk. This operation requires a high intensity laser beam, while reading the information is conducted by the use of a lower intensity laser beam. The laser beam which is used for reading the information has to be polarized. The angle of polarization of the beam changes when the beam passes through a magnetic field. Depending on the polarization or the direction of the magnetic vectors containing the information as compared to the direction of the vectors in the background, the angle of polarization changes accordingly. This can be detected through a number of conventional mechanisms and can be converted to electrical signals which in turn may take another desired form of energy. Since the change in the angle of polarization is very small, usually of the order of 1 to 2 degrees, noise in the form of birefringence by external factors is a problem.

Conventional devices such as the one shown in FIG. 7 may be utilized to measure the birefringence of the system, preferably when there is no information on the disk for better evaluation. Very small birefringence noise may be detected through a system containing 45 degree prisms and lenses by means of differential amplifiers, having as output an electrical signal. When glass is used as the defocusing substrate or layer there is no problem of birefringence since the defocusing layer can have very high uniformity and flatness. However, when plastic materials are being used, such as polycarbonate, in order to make the system less expensive and affordable to the general public, birefringence becomes a major problem. This is due to localized strains in the disk which result from stresses during processing, especially when two single sided disks are joined to form a double sided disk.

As mentioned above, a magnet, preferably an electro magnet, imposes an external field on the magnetic recording layer. A focused laser provides local temperature increases as high as 500K. Magnetic reversal or switching of the magnetic vectors on the films occurs in areas heated above the switching temperature by the focused laser beam. The imposed magnetization persists when the film cools down to room temperature. This process is called thermo remanent magnetization. Thus, as aforementioned, the writing is conducted by an intense laser beam in the presence of a bias magnetic field, of approximately 300 Oersteds (Oe). Erasing may be forced by using a continuous laser and a bias magnetic field of approximately −300 Oe. Information retrieval, otherwise called readout, is conducted by probing local magnetization status with a focused laser beam, which is continuous and of rather low power on the order of approximately 2 mW. During information retrieval or readout, no external or bias magnetic field is applied. The film temperature may be as high as 360K without affecting the information on the film. Local magnetization status determines polarization of the reflected beam by a phenomenon called "reflective Kerr effect". A differential amplifier converts the polarization differences, which are sensed by this process, to a digital electric signal.

The desired properties of optical recording media are (1) high sensitivity, (2) high signal-to-noise ratio (SNR), which may be highly affected by birefringence due to stresses within the protective layer in the case of magneto-optical disks, (3) high tolerance to material variation, contaminants and other defects, and (4) high archival stability after extended storage and/or recording and readout (See Bartolini, *J. Vac. Sci. Technology*, Vol. 18, No. 1, Jan./Feb. 1981, p. 70.). Based upon these criteria, a considerable amount of research has been and continues to be carried out directed to obtaining the best possible disk materials.

There is an enormous and rapidly growing abundance of patent references regarding different aspects of optical disks. Examples of different magneto-optical systems are described in U.S. Pat. Nos. 3,224,333, 3,472,575, 4,670,316, 4,684,454, and 4,693,943, among others.

Among the plethora of patents describing double-sided disks comprising two single-sided disks bonded with an adhesive, are represented U.S. Pat. Nos. 4,760,012, and 4,571,124 and Japanese Patent Application Nos. 62/042347, 63/050932, and 63/137893.

To improve flatness, promote the creation of a rugged structure, and avoid corrosion of the active layers, especially in the case of magneto-optical disks on plastic substrates, it is highly preferable to use an appropriate adhesive to bond the two single-sided disks instead of leaving a gap between the respective surfaces of the disks containing the information.

The methods, which have been used so far, however, to bond the two magneto-optical single-sided disks on each other, produce high birefringence noise, which according to the instant invention may be reduced considerably, and yield products of highly improved quality. This is mainly achieved by applying pressure under vacuum only to those zones of the disks which are outside the information surfaces.

Japanese Patent Application 62/213749 discloses a method, in which the external peripheral edge portion of the adhesive surface of at least one substrate (single-sided disk) projects in the direction of the inner side (adhesive surface side) from the portion corresponding to the recording sector. Thus, when the two substrates are bonded together by adhesive, the pressure applied to this peripheral edge is higher during bonding. Use of this technique is intended to improve the aesthetics of the periphery of the disk. In accordance with the teachings of this application, the air bubbles mixed in with the adhesive are either squashed or forced out. As a result the cloudiness caused by the air bubbles in the periphery of the adhesive layer is prevented and transparency is improved.

U.S. Pat. No. 3,282,763 describes a method of adhering a light reflector unit to a mounting surface by using a flexible adhesive backing and performing the adhering step under vacuum. More particularly, it describes a method of adhering a light reflector unit having an inner cavity to a mounting surface, comprising the steps of: confining air pressure within the inner cavity by positioning a flexible adhesive backing in hermetically sealed relation across the opening to the inner cavity; positioning the reflector unit so that the exposed adhesive face of the flexible backing is adjacent the mounting surface; exhausting air pressure from about the reflector unit to cause confined air pressure in the inner cavity of the reflector unit to urge the central portion of the adhesive face of the flexible backing outwardly into continuous and intimate adhering contact with the mounting surface; and pressing the peripheral portion of the exposed adhesive face into adhering contact with the mounting surface while maintaining an area of decreased pressure about the reflector unit.

None of the above two references recognizes, suggests or implies any solution to the problem of birefringence noise in double-sided magneto-optical disks bonded with an adhesive.

SUMMARY OF THE INVENTION

In one aspect, the invention is directed to a two-sided magneto-optical recording disk having reduced birefringence comprising a pair of single-sided magneto-optic recording disks each comprising a flat dimensionally stable transparent substrate having a center hole, the recording side of which contains a central non-information area, an intermediate information area coated with magnetic recording material and a peripheral non-information area, the entire recording side of the single-sided recording disks being coated with and adhered together by means of a continuous layer of polymeric adhesive applied by the imposition of mechanical laminating pressure only upon the non-information areas of the disks.

In a second aspect, the invention is directed to a method for making two-sided magneto-optical recording disks having reduced birefringence comprising the sequential steps of (a) forming two single-sided magneto-optical recording disks each comprising a flat dimensionally stable transparent substrate having a center hole, the recording side of which contains a central non-information area annular to the center hole, an intermediate information area coated with a magnetic recording material adjacent to the central non-information area, and a peripheral non-information area adjacent to the information area;

(b) applying a continuous layer of compliant adhesive evenly across the surface of the recording side of both optical recording disks; and (c) laminating the adhesive-coated surfaces of both single-side disks to each other with the application of external mechanical pressure only to the non-information areas, thus forming an adhesive barrier between the recording side of both disks.

BRIEF DESCRIPTION OF THE DRAWINGS

The drawings consist of 7 figures:

FIG. 1 illustrates schematically the basic structures and principles used in conventional magneto-optical disks;

FIG. 2 is a more detailed schematic diagram of the components of a typical magneto-optical disk;

FIG. 3 is a schematic diagram illustrating two-single sided disks with an adhesive structure thereinbetween before their final assembly to form a double-sided magneto-optical disk;

FIG. 4 illustrates the same components presented in FIG. 3, in their final position, as well as the locations of applying mechanical pressure for the disk to attain low birefringence characteristics;

FIG. 5 is a schematic representation of a preferred embodiment of a two-sides magneto-optical disk in accordance with the invention.

FIG. 7 illustrates schematically a conventional system for measuring birefringence.

DETAILED DESCRIPTION OF THE INVENTION

Figure 6:
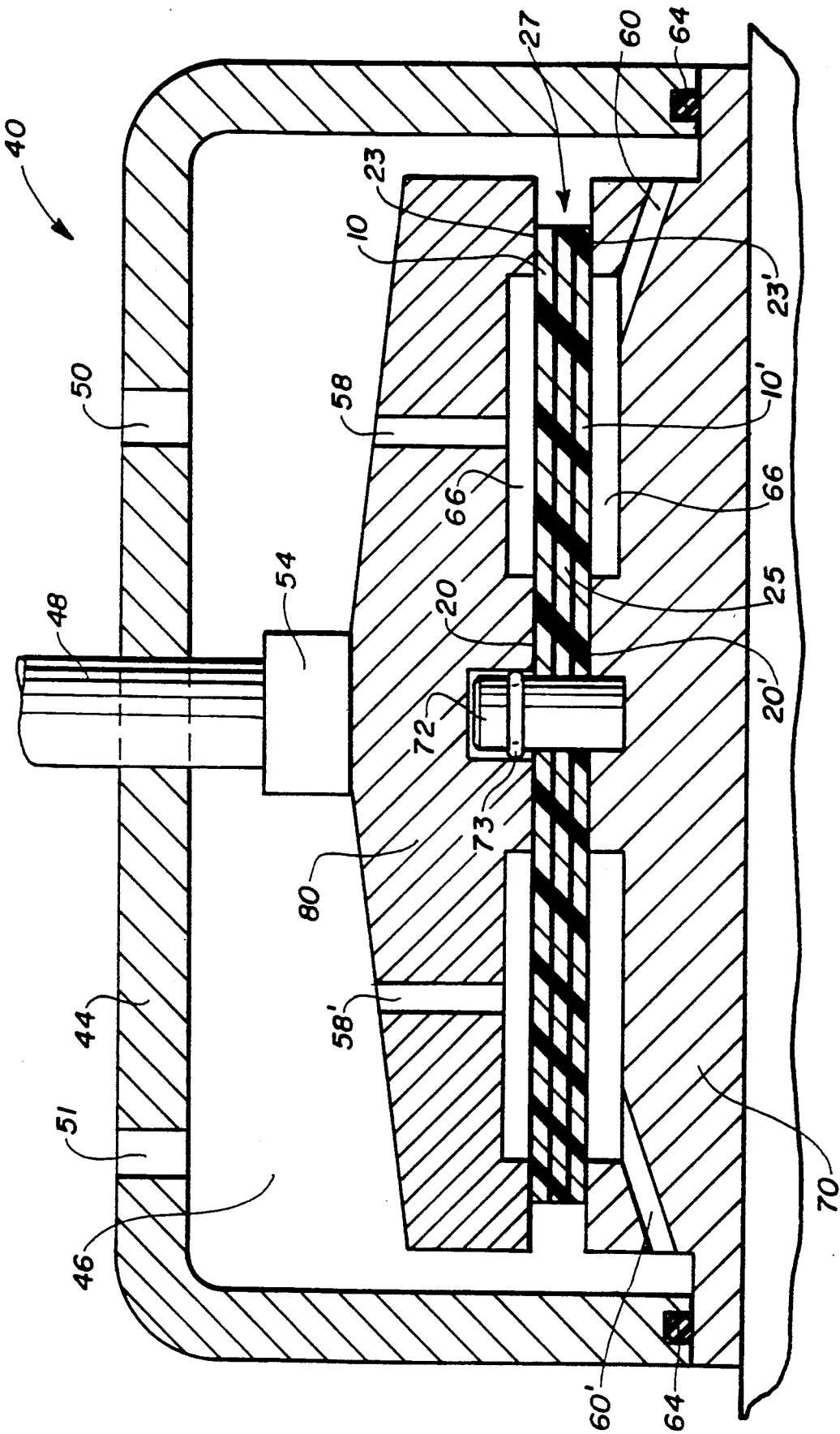
FIG. 6 is a schematic diagram of a press utilized in the fabrication of the double-sided magneto-optical disk according to the preferred embodiment of this invention.

The invention relates to a method of assembling two-sided magneto-optical disks in a way that the birefringence noise observed on either side of the fabricated double-sided disk is very low.

The invention is based on the discovery that, when making two-side magneto-optic discs from substantially flat, single-sided discs using substrate and ancilliary layer materials which have microscopic surface variations, e.g. surface roughness, irregularities and imperfections, the compression of the adhesive covering the recording layers during the laminating step results in the creation of discontinuous area of higher mechanical stress in the adhesive layer and in the other layers as well. This, in turn, results in an increase in the birefringence of the disc. Such areas of surface variation can be on the substrate, the recording layer, the thin film reflective layer, the protective layer or in the adhesive layer itself, but are particularly of concern when using molded polymer substrates. It has now been found that by compressing the adhesive only in the non-recording areas of the discs during the laminating process, the creation of mechanical stresses in the adhesive is considerably reduced and the birefringence of the asembled discs is reduced as well.

Referring now to FIGS. 3 and 4 there is shown a first substantially flat single-sided disk (10), and a second substantially flat single-sided disk (10'). The two single-sided disks may be formed by using conventional techniques. Each single-sided disk has an information area (13, 13'), a central non-informaiton area (19, 19') and a peripheral non-informaiton (22, 22'). There is also shown a durable flexible double-sided adhesive tape (25) placed between the recording sides of the two single-sided disks 10 and 10', so that the surfaces of both single-sided disks face the adhesive tape 25. The adhesive tape 25 extends over the entire face of the recording side of the disks 10 and 10'. The two single-sided disks 10 and 10' are assembled as a "sandwich" 27 by mechanically pressing them together under vacuum only, non-information areas denoted by the letter "P" in FIG. 4, in order to seal the laminate structure and form a double-sided disk having low birefringence. The pressure "P" is applied only at the peripheral non-information areas 23 and 23', and 20 and 20'. When the vacuum is released, the information surfaces 13 and 13' are pressed against the double sided tape 25 by the atmospheric pressure.

In general, the type of adhesive which is used for the invention is not critical from the standpoint of its composition. However, the adhesive should be free of corrosive ions such as chloride ions. It is, however, necessary that the adhesive be a complaint (soft) adhesive so that it will deform adequately during lamination. Thus, thermosetting adhesives, thermoplastic adhesives and contact adhesive films can be used so long as they are deformable under the lamination conditions of temperature and pressure. Adhesives which remain soft after application are preferred because they have less tendency to transmit vibrations and less tendency to incur mechanical stresses as well. The adhesives are preferred to be substantially non-crystalline in character, i.e. amorphous, but may nevertheless contain a minor amount of crystallinity. Adhesive application temperatures are generally in the range of −30° to 80° C., this being mainly a function of the thermorheological properties of the adhesive. The thickness of the adhesive layer will usually be on the order of 24–75 microns.

Pressure sensitive two-sided tape, hot melt, or other types of adhesives, such as epoxy or urethane based, for example, may be used in the practice of this invention.

Examples of suitable hot melt adhesives are, Eurelon ® 2138, a thermoplastic polyamide resin, which is a condensate of dimerized fatty acids reacted with diamines, from Shearex Company, Dublin, OH.

Jet Melt ® Adhesive 3748-TC, a hydrocarbon resin mixed with rubber, polypropylene, polyethylene, and aliphatic wax, from 3M COMPANY, Minneapolis, Minn.

Evergrip ® PS450-56 hot melt adhesive, based on a block copolymer styrene-butylene-ethylene-styrene, from A.C.I. Japan, Tokyo, Japan.

In the case where a double sided tape 25 is to be used, its preferable structure 26 before its final use within the construction of the double sided mangeto-optical disk may be seen in FIG. 5. In a preferred embodiment of this invention, the tape comprises a central substrate 25A, preferably made from Mylar ® polyester, on which there are laminated two adhesive layers 25B, and 25B', one on each side of 25A. A suitable adhesive layer to be used for this application is an adhesive coating on a release layer, sold by 3M Company under the name δ467 Hiperformance Adhesive". The thickness of the Mylar substrate is preferably 75 to 175 micrometers, while the thickness of each adhesive layer 25B and 25B' is preferably 25 to 75 micrometers. These ranges of thickness provide sturdiness and good adhesion without imposing a cumbersome structure. The "467 Hiperformance Adhesive" layer is approximately 50 micrometers thick. On each side of this laminate, release layers 25C and 25C' are present before the composite tape is employed for the construction of the double sided disk. The adhesive should be made out of low-outgasing, thoroughly stable, high performance material, such as acrylic and silicone adhesives. It is very important for the long range quality of the disk to use adhesives which are insensitive to the everyday environment, i.e. heat, humidity and air quality.

In accordance with the preferred embodiment of this invention, press 40, shown in FIG. 6, may be used to make a double-sided disk characterized by low birefringence. Press 40 comprises a bell jar 44, which forms vacuum chamber 46 when sealed on top of bottom platen 70 with O-ring seal 64. Top platen 80, disposed above bottom platen 70 is connected to press shaft 48 through flex coupling 54. The bell jar 44 is provided with a backfill vent 50, which is closed while chamber 46 is under evacuation, and which is opened to allow air pass through it after the pressing operation has been completed. The evacuation of chamber 46 is performed through port 51. Both top and bottom platens have cavity vents 58, 58' and 60, 60', respectively, to allow chamber 46 communicate with cavities 66 and 66'.

Cavities 66 and 66' are designed to be commensurate to the size of the information surfaces 13 and 13' so that no mechanical pressure is applied on these surfaces at any time. On the contrary, the top and bottom platens are shaped and sized such as to be capable of mechanically pressing onto both central and peripheral non-information areas 20, 20', and 23, 23', respectively.

Finally, guiding post 72 is attached to the bottom platen, preferably to the center of the platen, to provide guidance or centering to the components of the double-sided disk. The size and position of post 72 should be commensurate to the size of position of opening 21, which preferably is located at the center of each component of the disk, Elastic O-ring 73, slightly protruding from the surface of the guiding post 72 to support components of the magneto-optical disk during the process of each formation.

In operation, bell jar 44 as well as top platen 80 are initially at a raised position. A single sided disk is passed through guiding post 72 and is positioned on top of platen 70, with the information surface facing up. One of the two liners, for example liner 25C", shown in FIG. 5, is peeled off the composite structure 26 such as to allow adhesive 25B' to be uncovered. The remaining structure 26 with the uncovered adhesive layer 25B' is positioned on top of single sided disk 20' through guide 72 and through O-ring 73. Bell 44 is then lowered all the way so as to be sealed through ring 64 over the lower bottom platen 70, backfill vent 50 is closed, and a vacuum is drawn through port 51. When the vacuum has been formed, the top platen 80 is lowered and presses the structure over the bottom platen 70 at the central 19' and peripheral 22' high pressure contact zones. After the pressure has been applied, the vacuum is removed through backfill vent 50, and the bell 44 is raised.

The second release liner 25C is then removed leaving the adhesive layer 25B in an exposed condition. In sequence, a second single sided disk 20 is positioned through guide 72 on top of O-ring 73, with its information surface 13 facing the exposed adhesive. O-ring 73 protrudes adequately from the surface of guide 72 to hold a disk in a raised position, but is allows the disk to pass through, if an adequate pressure, exceeding a certain limit is applied on the disk. Bell 44 is again lowered all the way so as to be sealed through ring 64 over the lower bottom platen 70, backfill vent 50 is closed, and a vacuum is drawn through port 51. The pressure within bell 44 should be less than 200 mm Hg, and preferably around 50 mm Hg. Although lower pressures than 50 mm Hg would not be harmful, it would take an unnecessarily long time to achieve. Pressures between 50 and 200 mm Hg have been found adequate to remove entrapped air from the adhesive and the rest of the structure. When the vacuum has been formed, the top platen 80 is lowered forcing initially single sided disk 20 to fall into place over single sided disk 20' and adhesive structure 25, and then it presses the structure over the bottom platen 70 at the central 19 and 19', and peripheral 22 and 22' high pressure contact zones, with a pressure of 0.03 to 0.7 kilograms per square centimeter preferably 0.03 to 0.3 kilograms per square centimeter and even more preferably 0.07 to 0.2 kilograms per square centimeter. Pressures lower than 0.03 kilograms per square centimeter are not very effective, while if they exceed 0.7 kilograms per square centimeter they may start introducing again streses even over the information portions, which in turn are translated to unacceptable birefringence noise. The pressure should be applied for more than 3 seconds, more preferably more than 5 seconds, and most preferably for 13 to 17 seconds. By applying the pressure for a longer time then 13 to 17 seconds, no improvements in performance are obtained. Application of mechanical pressure for less than 3 seconds has in most cases the same effect as the application of lower pressure would have had.

Following this, atmospheric pressure within the bell is reestablished, and bell 44 is raised again. In sequence, top platen 80 is also raised and the double sided magneto-optical disk thus formed is removed and placed in a proper casing.

Due mainly to surface tension phenomena, the surfaces of coatings in general, and for that matter the surfaces of the adhesive structures used according to the present invention, have a slight orange peel configuration and appearance, which shows up even after the two single-sided disks have bonded to a double sided disk by the process described above. Thus the contact between the disk and the adhesive is not absolutely continuous, but it follows the ridges of the orange peel configuration. In the high pressure contact zones, where mechanical pressure has been applied, lower parts of the adhesive's ridges are also brought in contact with the disk, thus increasing the total contact area. Upon release of the pressure, the contact area sill remains higher as compared to portions where no mechanical pressure has ever been applied, thus providing better adhesion and bonding between the adhesive and the disk. Also, the high pressure contact zones become visible, and remain visible even after removal of the pressure. These zones, due to the fact that they were subjected to higher pressures during the process, have resulted in high contact zones, looking more shiny when observed in an angle, having reduced orange peel and exhibiting higher contact.

The two parts of the operation may be carried out in one apparatus or in two different apparatuses.

EXAMPLES

EXAMPLE 1

By using an arrangement such as the one shown in FIG. 7, it was established that for certain end uses acceptable levels of birefringence should not exceed 1.2 mV as a readout signal.

Thirty-three double sided disks were made by using the standard process of pressing the disks all over their surface area. As an adhesive structure, there was used a Mylar ® polyester substrate having a thickness of approximately 125 micrometers with one adhesive layer on each side as shown in FIG. 6. The adhesive layer on a release liner is sold by 3M Company under the name "467 Hiperformance Adhesive". The thickness of each adhesive layer was approximately 50 micrometers. Mylar ® is a registered trademark of E.I. du Pont de Nemours and Co., Wilmington, Del. for polyester film material.

The birefringence measured on those disks was in an average 1.54 mV with a standard deviation of 0.24. The actual yield of acceptable pairs was 0.

Twenty-three double sided disks were made by using the process of this invention. The average readout signal was 1.15 mV with a standard deviation of 0.16, giving a yield of 43%.

Yields from other batches of disks made according to the present invention had values of 53.6, 41.0, 57.0, and 90.0, while the standard method yields continued to be very low or even zero.

In the case where a hot melt adhesive is desired to be used as the adhesive structure, the practice of the instant invention offers similar advantages in reducing birefringence. An apparatus as the one illustrated in FIG. 5 may also be used in this case.

In operation of this embodiment, as soon as two single sided disks are coated with the hot melt adhesive by using any conventional, well known in the art technique for hot melt adhesives, they are handled as follows:

One of the coated single sided disks is passed through guiding post 72 and is positioned on top of platen 70, with the information surface and the coated side facing up.

In sequence, a second single sided disk is positioned through guide 72 on top of O-ring 73, with its information surface and the coated side facing the down O-ring 73 protrudes adequately from the surface of guide 72 to hold a disk in a raised position, but it allows the disk to pass through, if an adequate pressure, exceeding a certain limit is applied on the disk. Bell 44 is lowered all the way so as to be sealed through ring 64 over the lower bottom platen 70, backfill vent 50 is closed, and a vacuum is drawn through port 51. The pressure within bell 44 should be less than 200 mm Hg, and preferably around 50 mm Hg, as already discussed. When the vacuum has been formed, the top platen 80 is lowered forcing initially the single sided disk held by the O-ring to fall into place over the single sided disk supported by the bottom platen 70, and then it presses the two disks together over platen 70 at the central 19 and 19', and peripheral 22 and 22' high pressure contact zones, with a pressure of 0.03 to 0.7 kilograms per square centimeter, preferably 0.03 to 0.3 kilograms per square centimeter, and even more preferably 0.07 to 0.2 kilograms per square centimeter. The time of applying this pressure should be more than 3 seconds, more preferably more than 5 seconds, and most preferably 13 to 17 seconds. By applying the pressure for a longer time, no improvements in performance are obtained.

Following this, atmospheric pressure within the bell is reestablished, and bell 44 is raised again. In sequence, top platen 80 is also raised and the double sided magneto-optical disk thus formed is removed and placed in a proper casing.

EXAMPLE 2

Fourteen disks were made according to the above method, and fourteen disks were made by the standard method of pressing the total area, by using in both cases "Evergrip PS450-56" hot melt adhesive from A.C.I. Japan, Tokyo, Japan.

The mean birefringence value in the case of the disks made according to the present invention was 0.44 mV with a standard deviation of 0.07, while in the case of disks made with the standard method, the mean value was 0.57 mV with a standard deviation of 0.14

This shows in an unambiguous way the advantages of employing the process of this invention to make a magneto-optical disk having lower birefringence.

I claim:

1. A method for making two-sided magneto-optic recording disks having reduced birefringence comprising the sequential steps of
   (a) forming two single-sided magneto-optical recording disks each comprising a flat dimensionally stable transparent substrate having a center hole, a recording side of which contains a central non-information area annular to the center hole, an intermediate information area coated with a magnetic recording material adjacent to the central non-information area, and a peripheral non-information area adjacent to the information area;
   (b) applying a continuous layer of compliant adhesive evenly across the surface of the recording side of both optical recording disks; and
   (c) laminating the adhesive-coated surfaces of both single-side disks to each other in a vacuum with the application of external mechanical pressure of 0.03–0.7 kg/cm$^2$ only to the non-information areas, thus forming an adhesive barrier between the recording sides of both disks.

2. The method of claim 1 in which the adhesive layer is in the form of a two-sided pressure-sensitive adhesive tape inserted between the recording side of the disks.

3. The method of claim 1 in which an adhesive layer is applied separately to both disks.

4. The method of claim 1 in which the recording side of the disks has a protective coating.

5. The method of claim 1 in which the non-recording side of the disk has a protective coating.

6. The method of claim 1 wherein the adhesive is a hot melt adhesive.

7. A two-sided magneto-optic recording disk having reduced birefringence comprising a pair of single-sided magneto-optic recording disks each comprising a flat dimensionally stable transparent substrate having a center hole, a recording side of which contains a central non-information area, an intermediate information area coated with magnetic recording material and a peripheral non-information area, the entire recording side of the single-sided recording disks being adhered together by means of a continuous layer of polymeric adhesive applied by the imposition of mechanical laminating pressure in a vacuum of 0.03–0.7 kg/cm$^2$ only upon the non-information areas of the disks.

* * * * *